United States Patent [19]
Haselwood et al.

[11] 3,742,463
[45] June 26, 1973

[54] DATA STORAGE AND TRANSMISSION SYSTEM

[75] Inventors: Donald E. Haselwood, Deerfield; Carl M. Solar, Glenview, both of Ill.

[73] Assignee: A. C. Nielsen Company, Chicago, Ill.

[22] Filed: Nov. 24, 1971

[21] Appl. No.: 201,919

Related U.S. Application Data

[62] Division of Ser. No. 15,696, March 2, 1970, Pat. No. 3,651,471.

[52] U.S. Cl. .......... 340/172.5
[51] Int. Cl. .......... G06f 9/18
[58] Field of Search .......... 340/172.5; 235/157

[56] References Cited

UNITED STATES PATENTS

| | | | |
|---|---|---|---|
| 3,231,868 | 1/1966 | Bloom et al. | 340/172.5 |
| 3,344,408 | 9/1967 | Singer et al. | 340/172.5 |
| 3,409,877 | 11/1968 | Alterman et al. | 340/172.5 |
| 3,299,410 | 1/1967 | Evans | 340/172.5 |
| 3,585,603 | 6/1971 | Ross et al. | 340/172.5 |

*Primary Examiner*—Gareth D. Shaw
*Assistant Examiner*—Mark Edward Nusbaum
*Attorney*—Mason, Willis J. Jensen et al.

[57] ABSTRACT

A system for economically monitoring via telephone a large number of remotely located television receivers orthe like. Remotely located data handling systems check the status of receiver groups once every 30 seconds. Whenever a change in status is detected, the altered status is recorded as a "change line data set" in a continuously circulating memorywhich can store forty such data sets. At periodic intervals a central unit contacts the remotely located data handling systems via telephone. The data sets are then repeatedly transmitted to the central unit in the form of a frequency modulatedaudio tone. With the aid of a marker bit that reverses its sign each time the circulating memory fully circulates, the central unit is able to extract the 40 data sets from the modulated tone and is also able to check for transmission errors.

21 Claims, 1 Drawing Figure

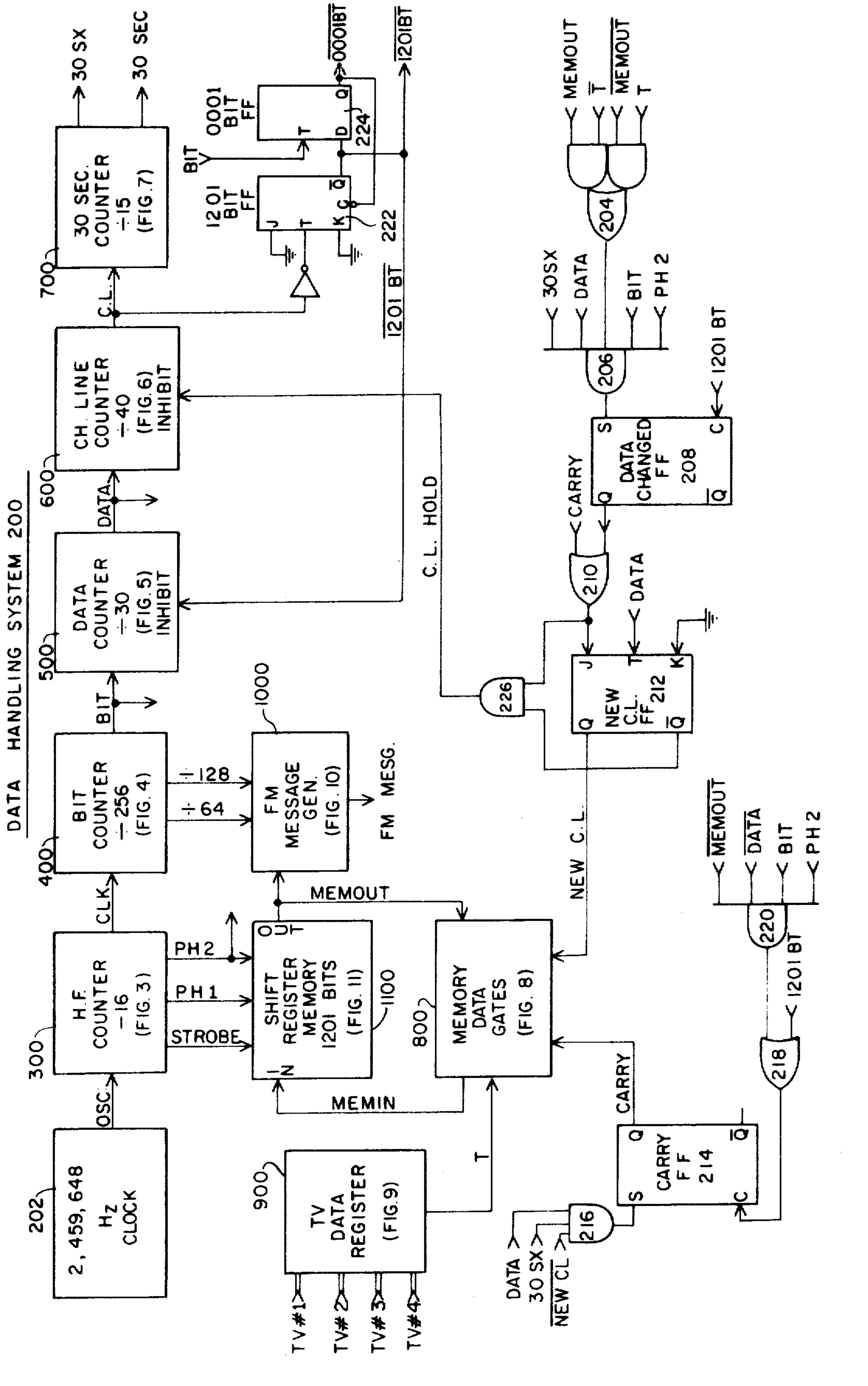
DATA HANDLING SYSTEM 200
2,459,648 Hz CLOCK
H.F. COUNTER ÷16 (FIG. 3)
BIT COUNTER ÷256 (FIG. 4)
DATA COUNTER ÷30 (FIG. 5) INHIBIT
CH. LINE COUNTER ÷40 (FIG. 6) INHIBIT
30 SEC. COUNTER ÷15 (FIG. 7)
SHIFT REGISTER MEMORY 1201 BITS (FIG. 11)
FM MESSAGE GEN. (FIG. 10)
MEMORY DATA GATES (FIG. 8)
TV DATA REGISTER (FIG. 9)
DATA CHANGED FF 208
NEW C.L. FF 212
CARRY FF 214
1201 BIT FF
0001 BIT FF
FM MESG.
C.L. HOLD
NEW C.L.
MEMOUT
MEMIN
TV #1
TV #2
TV #3
TV #4

DATA STORAGE AND TRANSMISSION SYSTEM

This is a division of application Ser. No. 15,696, filed Mar. 2, 1970, which issued as U.S. Pat. No. 3,651,471 on Mar. 21, 1972. The following portions of U.S. Pat. No. 3,651,471 are incorporated by reference into the present description as essential material: FIGS. 1 – 11 and 13 – 19; and the description extending from column 5, line 20 to column 24, line 38.

BACKGROUND OF THE INVENTION

The present invention relates to data storage and transmission systems and more particularly to monitoring systems for collecting data at remote locations and for transmitting this data to a central location. The present invention is particularly suitable for use as a television receiver monitoring system for collecting data as to the viewing habits of television viewers and for transmitting this data to a central location for statistical compilation.

In the past it has been customary to provide an arrangement which checks the status of each monitored television receiver about once every five minutes via telephone or via rented telegraph lines. Such arrangements use up a tremendous amount of telephone or telegraph time and thus are quite costly to operate. When the tuning of the home receivers does not change over an extended period, such arrangements collect a tremendous amount of duplicate data and, therefore, consume large amounts of telephone or telegraph time in merely checking to see if any monitored receiver has changed its status. Since sampling is performed only once every five minutes, such arrangements can miss short viewing intervals of five minutes or less and often cannot distinguish an extremely brief viewing interval from viewing intervals five minutes or more in length.

Attempts to provide improved data collecting arrangements have heretofore been largely unsuccessful. Some workers have attempted to provide systems which record the status of a television receiver on magnetic tape several times a minute with the tape being played back upon command from a central location at periodic intervals, say once a day or once a week. Such systems have generally proved unsatisfactory because of the expense and complication of providing a remotely controllable magnetic tape recording and playback mechanism. Magnetic tape would necessarily have to be used by such a system, since no other storage medium could hold the huge amount of data that would be generated by such a system. The chances of data errors in such a system are fairly great, since large amounts of data are first stored on tape and are then transferred over noisy telephone lines to a central station.

SUMMARY OF THE INVENTION

A primary object of the present invention is to provide a data storage and transmission system that can check the tuning condition and the on-or-off status of monitored television receivers several times a minute, that can record data characterizing the condition and status of the receivers, and that can transmit the recorded data rapidly and accurately to a central location over conventional telephone lines.

Another object is to design such a system which includes only memories of limited size and circuits of minimum complexity.

A further object of the present invention is to design such a system so that checks for transmission errors are easily carried out and so that repeat transmissions are automatically commenced if any transmission errors are found.

In accordance with these and many other objects, an embodiment of the present invention comprises briefly a data handling system suitable for use in a data storage and transmission system which can collect data characterizing tuning condition and on-or-off status of a large number of television receivers; store this data temporarily at remote locations; and then periodically transfer this data over long distance telephone lines to a centrally located digital computer. A data handling system is provided for each cluster of television receivers located within a signal building, home, or area. The data handling systems check the tuning condition and also the on-or-off status of each receiver within each cluster periodically, for example, once every 30 seconds. The data handling systems do not, however, record data characterizing the tuning condition and on-or-off status of the monitored receivers every thirty seconds. Data is collected only after a monitored receiver is re-tuned or is turned on or off. This data, along with the time that elapses before another tuning condition or on-or-off status change occurs, is compiled into a data set that is called a "change line" or "change line data set" and is stored within the data handling system.

Each data handling system includes a memory with a capacity to store a fixed number of such change lines. When more than that number of change lines are recorded, the newest change lines replace the oldest change lines, and the oldest change lines are discarded. Since change lines are recorded only when the tuning condition or on-or-off status of a receiver is altered, this memory can be small in size, yet it will still store sufficient data so that the central computer need not collect the data more often than once every twenty minutes or so during the prime viewing hours, and only once every half day or so at other times. This memory is far more compact and inexpensive than the magnetic tape memory required by conventional systems having similar time resolution capabilities.

The memory operates continuously and repeatedly presents the stored change lines in the form of a frequency modulated tone signal suitable for telephone transmission. Periodically the system contacts all of the remote data handling systems via telephone and monitors the frequency modulated signals. These tone signals are translated back into digital data. The system then checks the data against itself for transmission errors and stores the data for statistical processing. If any transmission errors are found, the stored data is discarded and the transmission procedure is repeated.

When the monitored receivers are checked, data characterizing the current tuning condition aand on-or-off status of the monitored television receivers is compared with the data portion of the change line most recently placed into the system memory (this change line will hereinafter be called the "current change line"). If the two data sets agree, then another portion of the current change line which serves as a record of elapsed time is incremented by one to indicate the passage of another fixed length time interval. If the two data sets disagree, then a new current change line is created. The data characterizing the present tuning condition and on-or-off status of the monitored receivers is loaded into the memory as the data portion of this new current change line, and the time portion of this new current change line is set to zero. As a result of this procedure, each change line within the memory includes a data portion which characterizes the tuning condition and on-or-off status of the monitored receivers during a specific time period and a time portion which contains a number equal to the number of fixed length time intervals which comprise the specific time period. In the preferred embodiment of the present invention, this is a binary number equal to the number of 30 second intervals which together comprise the specific time period, since the monitored receivers are checked once every 30 seconds.

A special marker bit within each of the data handling systems' memories is transmitted to the central computer as part of the frequency modulated tone signal and is reversed in sign each time it is transmitted. Since all the other data transmitted is normally not reversed in sign, the marker bit is easily found by the centrally located digital computer. The centrally located digital computer compares the bits comprising two successive transmissions and chooses as the marker bit the only bit which has changed its sign. Once having found where the marker bit lies, the computer can easily determine where within the transmitted signal each individual change line begins and ends. The use of a marker bit enables the centrally located digital computer to identify the various change lines without the necessity of two way communication between the computer and the data handling system. If more than one bit is found to have changed its sign, this is positive proof that a transmission error has occurred. Hence, the centrally located digital computer monitors successive transmissions continuously until two are finally received without error.

If an unusually long interval of time passes with no change in the tuning condition or the on-or-off status of the monitored television receivers, the storage capacity of the time portion of the current change line can be exceeded. When this happens, the time portion of the current change line is set to zero and a new current change line is automatically loaded into the memory. When the central computer comes upon a change line whose time portion is set to zero, the computer knows that such an overflow has occurred and is able to interpret the data accordingly.

In the preferred embodiment, a dynamic shift register type of memory is used in the data handling systems. This memory is of a type which must circulate at a certain minimum speed if data is not to be lost. The optimum circulation speed of this memory is such that data is presented at too fast a rate for telephone transmission. Therefore a sampling procedure is used to reduce the data presentation rate. In the preferred embodiment of the present invention, the memory contains 1201 bits, and only one out of every 256 memory output bits is sampled. This procedure allows the entire contents of the memory to be fed out at 1/256th of the basic memory circulation speed. In this manner, data is fed out of the memory at a speed that is suitable for telephone transmission. If a different data presentation rate is desired, some other rate of output sampling can be used. For example, the rate can be doubled by sampling once every 128 memory output bits. This same technique can be used with memories of other sizes, so long as the number representing the memory bit capacity and the number representing the rate of output sampling have no common primes.

The frequency modulated tone signal is one of two audio tones. If a memory output bit is a "0" bit, a first of the two tones is transmitted; if it is a "1" bit, the second tone is transmitted. The FM generator comprises a single flip-flop having an input connected to the memory output and having an output which gates one or the other of the audio tones into the frequency modulated tone signal depending upon its state.

Since the only arithmetic performed within the data handling units is that of adding "1" to the time interval count stored in the time portion of the current change line, a very simple form of arithmetic unit suffices. As the time portion of the current change line flows out of the memory one bit at a time, the bits are reversed in sign before being returned to the memory, up to and including the first "0" bit which flows from the memory. After a "0" bit is encountered, the sign reversal process is terminated, and the remaining bits are returned to the memory unaltered. If a "0" bit is not encountered, this indicates that the capacity of the time portion of the current change line has been exceeded. Such an occurrence initiates the creation of a new current change line, as explained above.

A power interrupt detector generates a tone signal whenever a local power failure causes a data handling system to switch over to its stand-by emergency batteries. This tone signal is transmitted along with the frequency modulated tone signal to the central computer. This tone signal tells the central computer that the remote unit will fail to respond if the batteries are fully discharged before power is restored.

When the transmitted data reaches the centrally located digital computer, two successive transmissions of data are compared bit by bit to assure that no transmission errors have occurred. If both transmissions are error-free, then only the marker bit is found to have reversed its sign. In this case one of the two transmissions is stored for statistical processing along with an indication as to the location of the marker bit. If more than one bit is found to have reversed its sign, however, this indicates that transmission errors have occurred. The above process is then repeated until finally two consecutive transmissions are found which contain only one bit that has reversed its sign.

By only recording data when there has been a change in the tuning condition or the on-or-off status of a monitored receiver, the present invention significantly reduces the amount of storage space required within the data handling systems, thereby reducing their cost, and simultaneously minimizes the number of telephone data collections which must be made. Telephone charges are thereby minimized, and yet a more accurate survey is obtained than any previously attainable. An interface unit associated with the central computer does much of the routine work of sorting and error-checking the incoming data. This performance of routine work by the interface unit together with the reduced volume of data attained through the use of change lines significantly reduces the amount of computer time required to process the incoming data. Hence, the present invention is able to provide an accurate survey at a lower cost than was possible with any previous arrangement.

Further objects and advantages of the present invention will become apparent as the following detailed description proceeds, and the features of novelty which characterize the present invention will be pointed out with particularity in the claims annexed to and forming a part of this specification.

BRIEF DESCRIPTION OF THE DRAWING

The drawing illustrates a partly diagrammatic and partly logical representation of a data handling system designed in accordance with the invention and suitable for use at a remote data collection point to monitor a plurality of digital variables.

DESCRIPTION OF THE PREFERRED EMBODIMENT

A full description of the preferred embodiment of the invention may be found in U.S. Pat. No. 3,651,471 which issued on Mar. 21, 1972, to the present inventors and which is assigned to the same assignee as the present patent. In particular, a data handling system 200, which represents the preferred embodiment of the invention, is described in FIGS. 1 to 11 and 13 and 19 of U.S. Pat. No. 3,651,471. A detailed description of the data handling system 200 is presented in U.S. Pat. No. 3,651,471 beginning at column 5, line 20 and continuing through column 24, line 38.

With reference to FIG. 1 of U.S. Pat. No. 3,651,471, a mechanism which may be used to adapt a conventional television receiver for use as elements 22, 24, 26, and 28 of FIG. 1 is disclosed partly in U.S. Pat. No. 2,751,449 (Krahulec, et al) and partly in U.S. Pat. No. 2,788,392 (Krahulec). U.S. Pat. No. 2,751,449 discloses a mechanism for generating binary code signals representing the tuning condition of a television receiver, and U.S. Pat. No. 2,788,392 discloses a mechanism for sensing the on-or-off status of a television receiver.

With reference to FIG. 1 of U.S. Pat. No. 3,651,471, a telephone transmitting unit which may be used as element 34 of FIG. 1 is disclosed as element 25 in FIG. 1*a* of U.S. Pat. No. 2,788,392 (Krahulec). In the preferred embodiment of the invention, element 38 is an automatic dialer model 801 which is manufactured and leased by Western Electric Company, Incorporated. Element 40 is an IBM Model 1130 digital computer equipped with an 801/202 interface to the automatic dialer and to the telephone receiving unit, manufactured and leased by IBM Corporation, Poughkeepsie, N.Y.

We claim:

1. A data storage and presentation system for continuously monitoring a plurality of digital variables presented by digital variable presentation means, said system comprising:

a memory;

resettable time measuring means for measuring time intervals and for generating numbers proportional to the length of time intervals;

storage means connecting said time measuring means and said digital variable presentation means to said memory for storing within said memory data supplied by said digital variable presentation means and representing the status of said digital variables and also numbers supplied by said time measuring means and representing the length of time intervals;

comparison means connected to said digital variable presentation means for comparing stored data representing the present status of the digital variables to the actual present status of the digital variables as indicated by said presentation means and for actuating said storage means and for reinitiating said time measuring means whenever the digital variables change their status; and message generator means for presenting the memory contents as a message suitable for transmission.

2. A data storage and presentation system in accordance with claim 1 wherein broadcast receivers are connected to the digital variable presentation means and wherein the broadcast receivers include means for generating digital variables representing the tuning condition and the on-or-off status of the broadcast receivers.

3. A data storage and presentation system in accordance with claim 2 wherein the broadcast receivers are television receivers.

4. A data handling system for continuously monitoring a plurality of digital variables presented by digital variable presentation means, said system comprising:

a circulating memory having a fixed capacity which includes means for repeatedly presenting, and which contains at least one marker bit, and further including memory data gates disposed in the memory circulation path for reversing the sign of this marker bit each time the memory data fully circulates;

storage means for intermittently storing within the circulating memory in sequentially spaced memory locations data sets containing records of the fluctuations in the associated digital variables, whereby each new data set automatically replaces the oldest data set within the fixed capacity memory; and message generator means for continuously converting the memory output signal into a message signal.

5. A data handling system for continuously monitoring a plurality of digital variables presented by digital variable presentation means, said system comprising:

a circulating memory having a fixed capacity which includes means for repeatedly presenting its contents as a memory output signal;

storage means for intermittently storing within the circulating memory in sequentially spaced memory locations data sets containing records of the fluctuations in the associated digital variables, whereby each new data set automatically replaces the oldest data set within the fixed capacity memory;

message generator means for continuously converting the memory output signal into a message signal; and counting means are provided for counting the flow of data bits through the memory and for actuating the message generator at time intervals spaced apart by the time it takes a fixed number of bits to flow through the memory, whereby the data bits comprising the memory output signal are sampled by the message generator means periodically at a sampling rate that is substantially slower than the memory output signal presentation rate, said sampling rate being chosen so that the number representing the memory bit capacity has no common primes with the ratio of the memory output signal bit presentation rate to the sampling rate.

6. A data handling system for continuously monitoring a plurality of digital variables, said system comprising:

circulating memory which repeatedly presents the memory contents as a memory output signal;

storage means for storing within the memory data sets containing records of the fluctuations in the associated digital variables;

message generator means for converting the memory contents into a message signal; and comparison means for periodically comparing the digital variables with the record of the digital variables contained within the data set most recently placed into the memory, said comparison means actuating the storage means whenever the digital variables disagree with the record contained within the data set most recently placed into the, said comparison means includes a comparison gate into which the memory output signal is fed; serial data presentation means for presenting the digital variables serially to the comparison gate simultaneously with the appearance of the data set most recently placed into the memory within the memory output signal.

7. A data handling system in accordance with claim 6 wherein the serial data presentation means is a data register having a parallel data input connected to the digital variables and having a serial data output.

8. A data handling system in accordance with claim 6 wherein the memory includes memory data gates disposed in the memory circulation path, wherein the serial data presentation means also presents the digital variables serially to the memory data gates, and wherein the comparison means cause the memory data gates to feed the digital variables into the memory as part of a data set which replaces the oldest data set in the memory whenever the digital variables disagree with the record contained within the data set most recently placed into the memory.

9. A data handling system in accordance with claim 8 wherein the serial data presentation means is a data register having a parallel data input connected to the digital variables and having a serial data output.

10. A data handling system for continuously monitoring a plurality of digital variables presented by digital variable presentation means, said system comprising:

a circulating memory having a fixed capacity which repeatedly presents its contents as a memory output signal;

storage means connecting said digital variable presentation means to said memory for storing within the memory data sets containing records supplied by said digital variable presentation means and representing the status of said digital variables;

comparison means connected to said digital variable presentation means for comparing stored data representing the present status of the digital variables to the actual present status of the digital variables as indicated by said presentation means for actuating said storage means whenever the digital variable change their status; and tone message generator means for continuously converting the memory output signal into a message signal, comprising tone generator means for generating first and second frequencies and gating means controlled by the memory output signal for presenting one or the other of said tone frequencies as an output message signal in accordance with whether the memory output signal represents a "zero" or a "one" data bit.

11. A data handling system in accordance with claim 10 which includes a message signal output terminal wherein the gating means includes a source of timing signals, a flip-flop, a data input to the flip-flop connected to the memory output signal, a toggle input to the flip-flop connected to the source of timing signals, an output from the flip-flop, and gates controlled by the flip-flop output connecting the tone signals to the message signal output terminal, whereby the bits which flow from the memory are sampled at a rate determined by the frequency of the source of timing signals.

12. A data handling system for continuously monitoring a plurality of digital variables presented by digital variable presentation means, said system comprising:

a memory;

storage means for storing within the memory data sets containing values which the digital variables have assumed, said data sets also containing a number;

periodically energized arithmetic means for periodically adding a constant value to the number in the data set most recently fed into the memory by the storage means;

variable fluctuation detection means connecting to said digital variable presentation means for detecting changes in the status of said variables and for responding to such changes by actuating said data storage means; and time turnover detection means for actuating the storage means whenever the length of time during which the digital variables remain unchanged exceeds a fixed value.

13. A data handling system in accordance with claim 12 wherein the number within each memory data set is initially zero, and wherein the time turnover detection means comprises a circuit which responds to the presence of an arithmetic carry overflow signal of said arithmetic means which overflow signal indicates that the time interval storage capacity of the data set has been exceeded.

14. A data handling system in accordance with claim 13 wherein the memory is a circulating memory, further including memory data gates in the memory circulation path for reversing the sign of memory data bits in response to a carry signal, further including a carry flip-flop which is set and which generates the carry signal when the number within the most currently recorded data set begins to flow from the memory, further including gate means responsive to a "zero" data bit flowing from the memory for clearing the carry flip-flop, and wherein the time turnover detection means comprises means for generating a signal that is a carry signal strobed after the number within the most currently recorded data set has completely flowed out of the memory and in which said strobed carry signal is the arithmetic carry overflow signal.

15. A data handling system in accordance with claim 13 wherein the memory is a circulating memory, further including a change line pulse generator which generates a pulse each time the most recently recorded data set flows from the memory, wherein the storage means comprises memory data gates in the memory circulation path for loading the values of the digital variables and the number zero into the memory in response to a new change line signal and for inverting the memory data bits in response to a carry signal, wherein the new change line signal is initiated by either the comparison means or by the time turnover detection means, wherein means are provided for inhibiting the change line pulse generator from terminating the change line pulse during the time when a new data set is fed into the memory, wherein the arithmetic means are actuated by the change line pulses to generate the carry signal while the bits up to and including the first "zero" bit in the number portion of the data set most recently stored flow through the memory data gates.

16. A data handling system in accordance with claim 12 wherein the memory is a circulating memory containing an extra marker bit in addition to a fixed number of data sets, wherein a data signal generator generates a data signal each time a data set flows out of the memory, wherein a marker bit signal generator generates a marker bit signal when the marker bit flows from the memory, and wherein the marker bit signal inhibits the data signal generator while the marker bit flows out of the memory.

17. A data handling system in accordance with claim 16 and further including memory data gates in the memory circulation path, said memory data gates responding to the marker bit signal by reversing the sign of the marker bit as the marker bit circulates through the memory data gates.

18. A data handling system for continually monitoring a plurality of digital variables presented by digital variable presentation means, said system comprising:

a memory;

data storage means connecting to said memory and to said digital variable presentation means for transferring data defining the state of said variables from said presentation means into said memory;

timing means for measuring the passage of time and including means for generating data representing elapsed time; and means for intermittently actuating said data storage means and for transferring data from said timing means into, said means for intermittently actuating including variable fluctuation detection means connected to said digital variable presentation means for detecting changes in the status of said variables and for responding to such changes by actuating said data storage means and by transferring data from said timing means into said memory when said storage means is actuated.

19. A data handling system in accordance with claim 18 wherein said timing means includes means for generating as data a number proportional to the length of a time interval the beginning of which interval is determined by a reset means which reset the value of said number whenever said storage means is actuated.

20. A data handling system in accordance with claim 19 wherein the reset means comprise means for storing a number in said memory whenever data defining the state of said variables is fed into said memory by said storage means, and wherein the timing means additionally comprises means for periodically adding a constant to the number most recently placed in said memory by said reset means, whereby the memory location occupied by the number most recently placed in said memory forms a part of said timing means.

21. A data handling system in accordance with claim 20 wherein the memory is a circulating memory which repeatedly presents the memory contents as a memory output signal, and which system includes memory data gate means disposed in the memory circulation path for reversing the sign of the memory data bits in response to a carry signal, and wherein the arithmetic means includes means for initiating said carry signal periodically as the number most recently placed in said memory flows through the data gates and also includes means for terminating the carry signal after the least significant "zero" bit within the number is inverted by the memory data gate means.

* * * * *

PO-1050
(5/69)

UNITED STATES PATENT OFFICE
CERTIFICATE OF CORRECTION

Patent No. 3,742,463 Dated June 26, 1973

Inventor(s) Donald E. Haselwood and Carl M. Solar

It is certified that error appears in the above-identified patent and that said Letters Patent are hereby corrected as shown below:

In the "ABSTRACT OF THE DISCLOSURE":
Line 3, change "orthe" to --or the--
Line 7, change "memorywhich" to --memory which--
Line 12, change "modulatedaudio" to --modulated audio--

Column 2, line 56, change "aand" to --and--
Column 5, line 21, change "13 and 19" to --13 to 19--
Column 6, line 23, after "presenting" insert --its contents as a memory output signal,--
Column 7, line 14, after "the" insert --memory--
line 16, after ";" insert --and--
Column 10, line 1, delete "," insert --said memory when said storage means is actuated,--
line 12, after "which" insert --time--

Signed and sealed this 1st day of October 1974.

(SEAL)
Attest:

McCOY M. GIBSON JR.
Attesting Officer

C. MARSHALL DANN
Commissioner of Patents